(No Model.) 3 Sheets—Sheet 1.
F. A. HOLLEMAN.
CONTROLLING AND DISCHARGE VALVE FOR COMPRESSED AIR BRAKES.
No. 527,855. Patented Oct. 23, 1894.
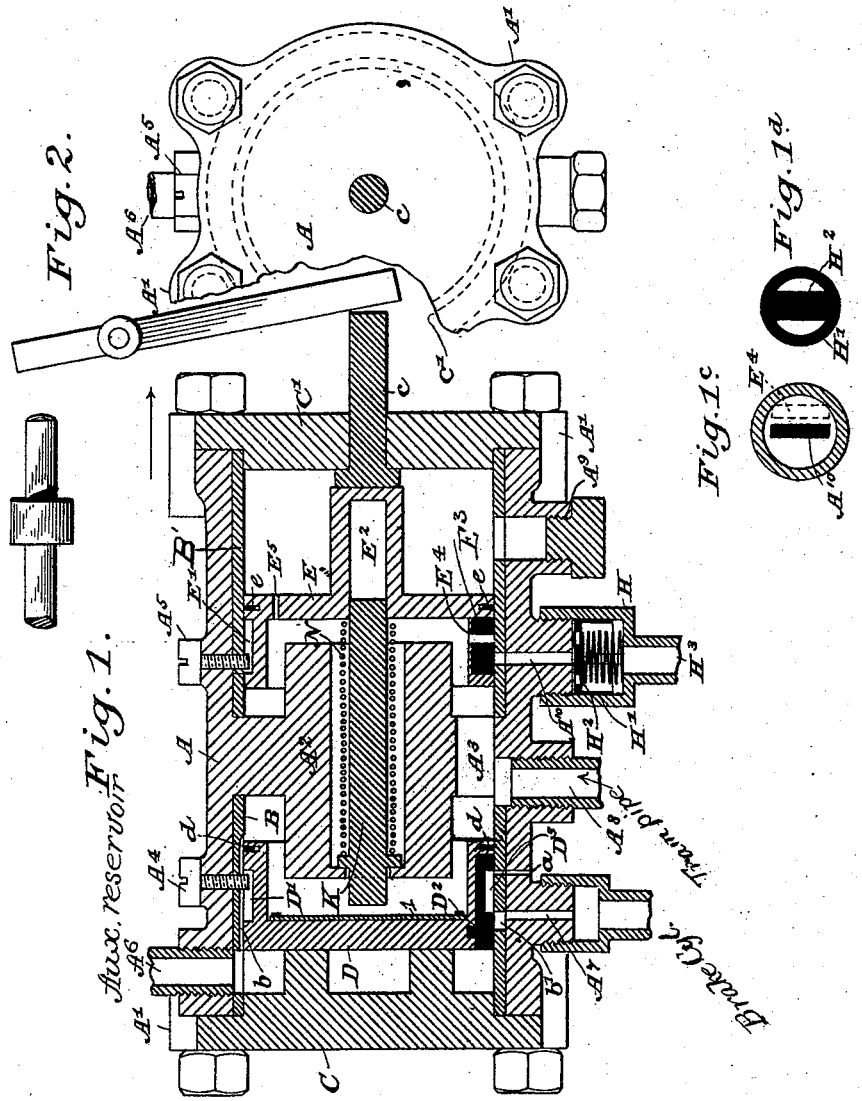
WITNESSES:
E. B. Bolton
E. K. Sturtevant
INVENTOR
Frederick Arnold Holleman
BY
Richards
ATTORNEYS (No Model.)  3 Sheets—Sheet 2.
F. A. HOLLEMAN.
CONTROLLING AND DISCHARGE VALVE FOR COMPRESSED AIR BRAKES.
No. 527,855. Patented Oct. 23, 1894.
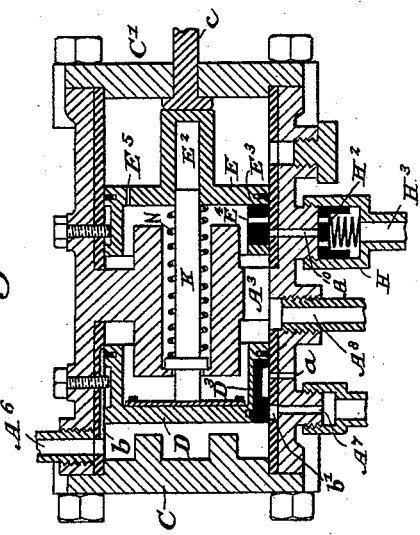
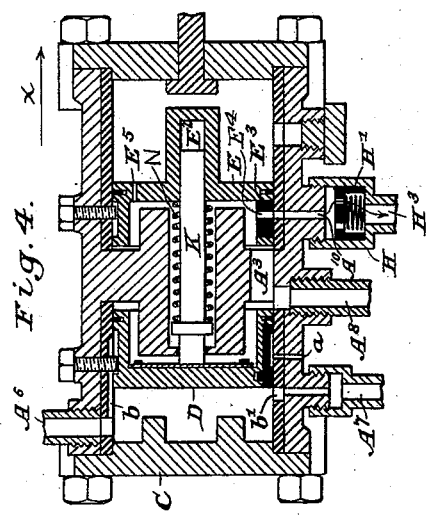
WITNESSES:
INVENTOR
ATTORNEYS (No Model.) 3 Sheets—Sheet 3.
F. A. HOLLEMAN.
CONTROLLING AND DISCHARGE VALVE FOR COMPRESSED AIR BRAKES.
No. 527,855. Patented Oct. 23, 1894.
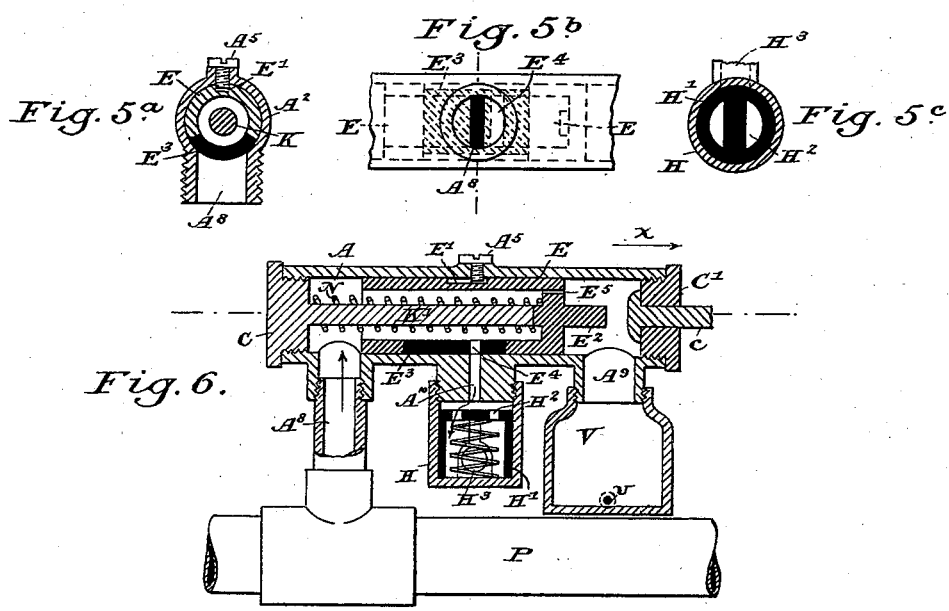

UNITED STATES PATENT OFFICE.

FREDERIK ARNOLD HOLLEMAN, OF OISTERWIJK, THE NETHERLANDS.

CONTROLLING AND DISCHARGE VALVE FOR COMPRESSED-AIR BRAKES.

SPECIFICATION forming part of Letters Patent No. 527,855, dated October 23, 1894.

Application filed February 21, 1893. Serial No. 463,151. (No model.)

*To all whom it may concern:*

Be it known that I, FREDERIK ARNOLD HOLLEMAN, a subject of the Queen of The Netherlands, and a resident of Oisterwijk, in the Kingdom of Holland, have invented a new and useful Improvement in Controlling and Discharge Valves for Compressed-Air Brakes, of which the following is a specification.

This invention relates to valves for use in connection with compressed air-brakes whereby these brakes can be transformed into quick-acting brakes.

In the accompanying drawings, Figures 1, 3 and 4 are longitudinal sections of the valve-casing showing the valves in different positions. Fig. 2 is a partial end view of the casing. Figs. $1^c$ and $1^d$ are sections of parts of the valve. Figs. 5 and 6 are longitudinal sections of the valve-casing connected to the main-air pipe showing the discharge valve in different positions and Figs. $5^a$, $5^b$ and $5^c$ are sections and a view of parts of this valve.

In Figs. 1, 2, 3 and 4 A is the valve casing with covers C and C' screwed to it, the bosses A' being provided for such purpose.

The valve-casing A has a diaphragm or divisional piece $A^2$ with a wide aperture $A^3$ which establishes free communication between the spaces on both sides of the division $A^2$. There are in these spaces reciprocating valves D and E, which are accurately but freely fitted in brass cylinders B B' with which the casing is lined. The valves have grooves D' E' into which enter loosely screw pins $A^4 A^5$ which prevent the valves from moving in a rotary direction. Packing-rings $d, e$ are provided to insure a perfect airtight fit in the casing.

The valve casing and the brass sleeves B B' have openings $A^6 A^7$ and $A^8$ by means of which the former is connected respectively with the auxiliary air-reservoir through $A^6$ with the brake cylinder through $A^7$ and with the main air pipe through $A^8$. Besides these openings the valve casing contains an opening $A^9$ (closed by a screw nut) for the reception of small quantities of condensed water and to the further opening $A^{10}$ a valve chamber H is applied which contains a valve H' having openings $H^2 H^2$. This valve H' is supported by a very sensitive spring. (Fig. $1^d$ shows the valve H' in cross section.) In the brass cylinder B is a port $b$ establishing communication between the main air pipe and auxiliary air-reservoir in the normal position of the valve D (Fig. 1) and an aperture $b'$ leading to passage $A^7$.

The cover C' is traversed by an airtight valve or pin $c$, by means of which the valve E can be moved inwardly.

In a cut out portion of the valve D there rests a block $D^2$ having a stud, which projects into the periphery of the valve and by which the block $D^2$ is moved simultaneously with the valve D. The block $D^2$ slides air tight over the apertures $b'$ and $a$. The slide $D^2$ has a recess $D^3$ which during the normal position of the valve (Fig. 1) establishes a constant communication between the brake cylinder and the open air through $A^7 b'$ and $a$.

In order to resist heavy shocks the valve D has its interior covered with leather 1. Its movement is limited by the abutment of the division $A^2$ and by that of the cover C, and it is regulated by the buffer K and the spring N, which is kept compressed in the interior of the division $A^2$ and by the discharge valve E, the latter valve being continually pressed toward the cover C' with sufficient force to overcome the friction occasioned by both valves D and E and their blocks.

The valve E has a hollow extension $E^2$ supporting and guiding the buffer K, which enters it when the spring N is further compressed by the movements of the valves D and E. The valve E has a cut out portion containing a block $E^3$, which is provided with an elongated opening $E^4$ (Fig. $1^c$) and in its top a small opening $E^5$, which provides a contracted passage between the main air pipe and the space behind the valve E.

The manner in which the valves operate is as follows: When compressed air is admitted to the valve-casing from the main air pipe, the valve D is moved toward the cover C and so brought into its first or normal position as shown in Fig. 1. The compressed air now passes through the groove $b$ and enters the auxiliary cylinder by way of the pipe $A^6$. At the same time it passes through $A^3$ and $E^5$ behind the valve E until equilibrium in the whole valve-casing is established. Slight differences of pressure in the main-air-pipe and auxiliary reservoir are equalized without moving the valves D and E, but when the pressure in the main pipe becomes reduced or falls below the pressure in the auxiliary reservoir, the valve D, by reason of the greater pressure of air in this reservoir, moves toward the buffer K, thus coming into its second position (Fig. 3) cutting off the communication through the port $b$ between the main pipe $A^8$ and the auxiliary reservoir and also the passage $A^7$ $b'$ $D^3$ $a$ from the brake cylinder to the open air. When the reduction of pressure in the main-pipe increases, the spring N is compressed by the valve D, which now uncovers the aperture $b'$, so that compressed air of the reservoir enters the brake cylinder in small quantities thus applying the brakes slightly. As soon as the pressure in the reservoir has been nearly reduced to a pressure equal to that in the main pipe, the valve D will move back to its second position (Fig. 3) under the influence of the spring N, so that no more air can then enter the brake cylinder nor escape from it. By repeating thus the admission of small quantities of compressed air to the brake cylinder through $b'$ $A^7$, the brakes can be applied gradually with any desired amount of force. When it is desired to put on the brakes with more speed and energy, the pressure in the main-pipe must be steadily more reduced. The valve D will then be moved farther to the right and come into its extreme or third position, (Fig. 4.) The oblong apertures $b'$, $A^7$ are then fully uncovered and compressed air from the auxiliary reservoir enters freely the brake cylinder operating the brakes with full force until the pressure in said reservoir becomes equal to that in the main-pipe, the valve D being then brought back in its second position. During these operations the discharge valve E remains inactive in its place as the pressure of the small quantity of air behind the valve E is easily reduced through the passage $E^5$ in the same degree as the pressure in the main pipe is gradually diminished so that the valve E will not move. When on the contrary the pressure in the main pipe is suddenly reduced, the compressed air behind the valve E can not escape in time through the small passage $E^5$, so that the valve is moved by the air behind it to the position shown in Fig. 4. The valve D then allows air from the reservoir to enter freely into the brake cylinder. By the valve E the wide opening $E^4$ is brought into connection with $A^{10}$, allowing air of the main pipe to escape in the open air through $A^8$ $A^3$ $E^4$ $A^{10}$, thus effecting a speedy discharge of the main air pipe throughout its entire length and an accelerated operation of all brakes. For that purpose the valve chamber H heretofore described, is screwed on $A^{10}$. The compressed air passes from $A^{10}$ through the oblong openings $H^2$ and by the pipe $H^3$ to the brake-cylinder, where it contributes to the operation of the brakes. A return of compressed air from the filled brake cylinder to the partially emptied main pipe is prevented by the valve H'.

The automatic operation of the compressed air brakes is greatly increased in case of accidents by means of the pin $c$, when the last two or three millimeters of traverse of the pressed in buffers $x$ of the carriage are used to move a lever $y$, pivoted at $z$, in the direction of the arrow Fig. 5. By means of the lever $y$ not shown and of any suitable construction the pin $c$, being pressed in the opposite direction, moves the valve E inwardly thus effecting a sudden discharge of the main pipe through $A^3$ $E^4$ $A^{10}$ and applying all brakes with full force before impending shocks arrive.

The manner in which the discharge valve operates for all kinds of brakes so as to transform them into quick-acting brakes by effecting an accelerated discharge of the main pipe throughout its entire length is illustrated in Figs. 5 and 6.

The valve-casing A has no controlling valve and is connected to the main air pipe P by a single connection. The same letters of reference indicate the same parts in this valve as in the combined controlling and discharge-valve of Figs. 1 to 4.

V is a vessel to enlarge the space behind the valve. It has a cock $v$ to draw off the condensed water. The buffer K is formed in this valve of an abutment K' of the cover C, by which the movement of the valve E is limited. The spring N presses it against the cover C'. The block $E^3$ is a longer one. Fig. $5^b$ is a plan view and Fig. $5^a$ a cross section on the line $y$ $z$ of it and of the valve casing A. Fig. $5^c$ is a cross section of the valve H' showing the location of the oblong openings $H^2$ and of the pipe $H^3$ to the brake cylinder. Fig. 5 shows the normal position of this valve. When, however, the pressure in the main pipe P is suddenly reduced, the valve will move to the left by the pressure of the compressed air behind the valve and in the vessel V and then uncovers $A^{10}$, so that compressed air of the main pipe escapes in the open air through $A^8$ $E^4$ $A^{10}$ or to the brake cylinder by the pipe $H^3$, where it contributes to the operation of the brakes as heretofore mentioned. The valve returns in a few moments to its normal position (Fig. 5) by the action of the spring. Brakes can thus be operated in the ordinary manner with any desired amount of force without any risk being incurred that they will operate suddenly with full force against the intention of the driver.

The action of the pin or valve $c$ is the same as heretofore described.

Having now described my invention, what I claim is—

1. In combination with a cylinder A, a train pipe connection therewith, a discharge pipe $H^3$, port $A^{10}$ in the cylinder, a valve E having a flange covering said port and provided with an opening therein registering with said port in one position, a contracted passage through said valve to the pressure side of the valve and a chamber in rear of the valve, a pin $c$ engaging said valve and extending outside the cylinder, the said pin being adapted to move said valve to uncover the discharge, substantially as described.

2. In combination with the cylinder A, the projection $A^2$, an inlet from the train pipe, an auxiliary reservoir in connection with said cylinder, a connection from the brake cylinder and an outlet to the outside air, a valve D controlling the ports leading to the auxiliary reservoir, the brake cylinder and the outside air, a spring pressed plunger K carried by the central projection, a discharge pipe $H^3$, a port $A^{10}$ in the cylinder a valve E having a flange with an opening adapted to register with the port $A^{10}$ said valve being located in a pressure chamber and having a contracted passage through the same, a pin engaging said valve and means for operating the pin substantially as described.

In testimony that I claim the foregoing as my invention I have signed my name, in presence of two witnesses, this 11th day of January, 1893.

FREDERIK ARNOLD HOLLEMAN.

Witnesses:
  NICOLAAS FELIX,
  LAURENS VAN'T HOFF.